US012565734B2

(12) United States Patent
Dyksterhouse

(10) Patent No.: US 12,565,734 B2
(45) Date of Patent: Mar. 3, 2026

(54) METHODS AND SYSTEMS FOR MANUFACTURING ROPE

(71) Applicants: Trillium Marketing, Inc.; Joel A. Dyksterhouse, Harbor Springs, MI (US)

(72) Inventor: Joel A. Dyksterhouse, Harbor Springs, MI (US)

( * ) Notice: Subject to any disclaimer, the term of this patent is extended or adjusted under 35 U.S.C. 154(b) by 0 days.

(21) Appl. No.: 18/290,513

(22) PCT Filed: May 23, 2022

(86) PCT No.: PCT/US2022/030564
§ 371 (c)(1),
(2) Date: Nov. 14, 2023

(87) PCT Pub. No.: WO2022/251124
PCT Pub. Date: Dec. 1, 2022

(65) Prior Publication Data
US 2024/0254690 A1     Aug. 1, 2024

Related U.S. Application Data

(60) Provisional application No. 63/192,072, filed on May 23, 2021.

(51) Int. Cl.
*D07B 5/12*          (2006.01)
*B29C 48/00*          (2019.01)
(Continued)

(52) U.S. Cl.
CPC ............ *D07B 5/12* (2013.01); *B29C 48/0021* (2019.02); *D07B 1/02* (2013.01); *D07B 1/162* (2013.01);
(Continued)

(58) Field of Classification Search
CPC . D07B 1/02; D07B 1/162; D07B 5/12; D07B 7/145; D07B 2207/40; B29C 48/0021
See application file for complete search history.

(56) References Cited

U.S. PATENT DOCUMENTS

| | | | | | |
|---|---|---|---|---|---|
| 3,800,522 | A | * | 4/1974 | Hughes | D07B 7/145 |
| | | | | | 57/215 |
| 4,123,894 | A | * | 11/1978 | Hughes | D07B 1/068 |
| | | | | | 57/220 |

(Continued)

FOREIGN PATENT DOCUMENTS

| | | | | | |
|---|---|---|---|---|---|
| FR | | 1458577 | A * | 3/1966 | B29C 47/30 |

OTHER PUBLICATIONS

Translation of FR 1458577.*

*Primary Examiner* — Shaun R Hurley
(74) *Attorney, Agent, or Firm* — Mitchell Law PLLC; Matthew W. Mitchell

(57) ABSTRACT
A method for manufacturing rope is disclosed. The method includes receiving a plurality of thermoplastic polymer or resin impregnated rovings, combining the plurality of thermoplastic polymer or resin impregnated rovings into a combined roving, tensioning the combined roving, heating the combined roving, removing excess thermoplastic polymer or resin from a surface of the combined roving, and chilling the combined roving while under tension.

19 Claims, 6 Drawing Sheets

(51) Int. Cl.
    *D07B 1/02*           (2006.01)
    *D07B 1/16*           (2006.01)
    *D07B 7/14*           (2006.01)

(52) U.S. Cl.
    CPC .......... *D07B 7/145* (2013.01); *D07B 2207/40*
                                       (2013.01)

(56)             References Cited

U.S. PATENT DOCUMENTS

| | | | | |
|---|---|---|---|---|
| 5,128,198 | A * | 7/1992 | Dyksterhouse | B29C 70/54 |
| | | | | 428/338 |
| 5,843,231 | A * | 12/1998 | Spencer | C03C 25/18 |
| | | | | 65/447 |
| 6,875,385 | B2 * | 4/2005 | Hawley | B29C 45/1816 |
| | | | | 427/434.6 |
| 2002/0079607 | A1 * | 6/2002 | Hawley | B29C 48/2886 |
| | | | | 425/258 |
| 2016/0249942 | A1 * | 9/2016 | Olson | A61M 25/104 |
| | | | | 604/509 |
| 2019/0127539 | A1 * | 5/2019 | Dyksterhouse | C08J 5/042 |
| 2020/0397458 | A1 * | 12/2020 | Nakano | A61B 17/22 |
| 2021/0017475 | A1 * | 1/2021 | Braeckman | C11D 3/3765 |
| 2024/0247437 | A1 * | 7/2024 | Dyksterhouse | D07B 7/145 |

* cited by examiner

METHODS AND SYSTEMS FOR MANUFACTURING ROPE

CROSS REFERENCE TO RELATED APPLICATIONS

This application claims the benefit of PCT application PCT/US22/30564 filed May 23, 2022, which claims the benefit of U.S. Provisional Application No. 63/192,072 filed on May 23, 2021 which are hereby incorporated herein by reference.

TECHNICAL FIELD

This disclosure relates to thermoplastic extrusion dies or coextrusion feedblocks, and more particularly to cables, ropes, or ribbons extruded through a die.

BACKGROUND

The statements in this section merely provide background information related to the present disclosure and may not constitute prior art.

Cable and wire ropes get their strength from braided or twisted strands or filaments that are either metallic or synthetic—each of which has tradeoffs.

Metallic cables and twisted ropes, compared to synthetic ones, are strong in proportion to their diameter (i.e., they have a high tensile strength). They are also more resistant to abrasion, cost less, and conduct electricity more effectively. But they have significant disadvantages. First, they are heavy (mass-to-strength ratio). Their weight makes them more expensive to ship and more difficult to handle, and large and expensive equipment is often required deploy them. Second, metallic cables and ropes require coatings—galvanic or plating, for example—to limit corrosion. Third, they kink permanently, which can cause broken filaments and fatigue. Fourth, loose broken metallic strands can cause bodily harm, especially in the form of puncture wounds. Fifth, connection loops—which allow for the connection of apparatuses, including but not limited to metal hooks, clevises, and termination tackle—require additional metallic clamps or crimps, which are difficult to install or replace. And finally, because of their off-axis construction, these cables and ropes stretch or elongate under pressure. Their elasticity, weight, rigidity, and hardness give them lethal potential when they break and "snap back," a shortcoming that has killed or severely injured many.

Conversely, synthetic cables and twisted ropes are lightweight and have a high strength-to-weight ratio. They are flexible, can be easily stored in small-diameter packages, and can be handled without large equipment. They resist corrosion better than their metallic counterparts, and generally, their filaments are more subtle and will not cause bodily injury when used normally. They are also comparatively inelastic and are less likely to injure by "snapping back" when broken. Furthermore, synthetic strands can be cut easily since they are unprotected, soft, and ductile.

These advantages, however, come at a cost. Synthetic ropes are made of strands that comprise hundreds or even thousands of individual synthetic filaments that have small diameters—microns in some cases. And because they are unprotected, these filaments can be easily damaged by friction, abrasion, or impact, caused by either environmental factors—such as UV, dirt, or extreme use—or by rubbing against neighboring filaments. If they are damaged, the rope or cable's strength, ease of use, cosmetics, and performance can suffer as a consequence.

Putting connection loops on the rope or cable terminals is difficult since mechanical fasteners—which are often metal and include crimps, sleeves, or other compression devices—usually damage the strands and filaments that make up the rope or cable and weaken it dramatically. Consequently, terminals must be spliced manually, which is tedious, expensive, and difficult in many environments. Water absorbency is yet another issue. Because the strands of these ropes or cables have considerable space between them, they absorb water easily when used in rain or snow and especially in aquatic environments—as net tendon connections for fishing trawlers, for example. The entrapped moisture makes the rope or cable more difficult to rewind and store; it can weaken the filaments; and it can lead to mold, which introduces more problems. If the entrapped water freezes, it stiffens the rope and makes it slippery, which is inconvenient at best and dangerous at worst. Finally, trapped water can conduct electricity through the rope or cable—an ironic weakness, since synthetic rope was originally developed to guard against electrical mishaps (Lineman ropes).

Therefore, a need exists for an improved rope, cable or ribbon and a thermoplastic extrusion die or coextrusion feedblock to make such an improved rope, cable, or ribbon.

SUMMARY

A thermoplastic extrusion die is disclosed. The thermoplastic extrusion die includes a housing, and a resilient or elastomer insert having an inlet through the housing, and a passage through the resilient insert. Embodiments have a mechanical locking mechanism configured to communicate physical pressure to the resilient or elastomer insert thereby narrowing the passage for contact with traversing rovings.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1A:
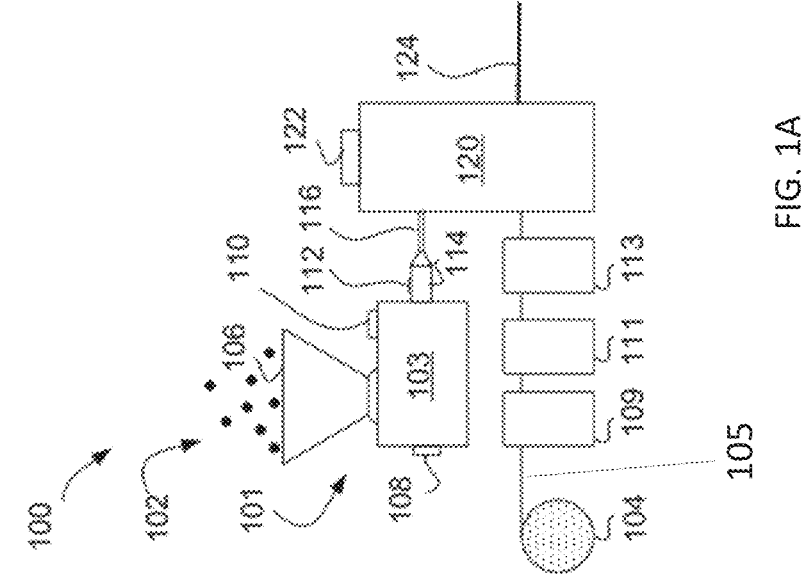
FIG. 1A schematically shows an exemplary thermoplastic polymer or resin impregnation system, in accordance with the present disclosure.

It is to be understood by one of ordinary skill in the art that the present discussion is a description of exemplary embodiments only, and is not intended as limiting the broader aspects of the present disclosure.

Generally, the present disclosure is directed to a cable or wire rope that may be formed from unidirectionally aligned continuous fibers. The fibers may be unidirectionally aligned continuous fibers.

The fibers may be impregnated, as described herein below, and the coated with a resin or thermoplastic polymer. The impregnating layer and the coating layer may be augmented one another, and/or complimented according to an intended application.

Although unique polymer and/or resin combinations and structure are one aspect of the present disclosure, it should be understood that fiber properties, fiber types, and fiber structure may also be adapted. In fact, one notable feature of the present disclosure is the ability to tailor the mechanical properties of the impregnation step for an intended application by selectively controlling certain process parameters, such as the type of continuous fibers employed, the concentration of the continuous fibers, along with the thermoplastic resin used for impregnation and for coating.

Various embodiments of the present disclosure will be described in detail with reference to the drawings, where like reference numerals represent like parts and assemblies throughout the several views. Reference to various embodiments does not limit the scope of the disclosure, which is limited only by the scope of the claims attached hereto. Additionally, any examples set forth in this specification are not intended to be limiting and merely set forth some of the many possible embodiments for the claimed disclosure.

The term "continuous fibers" refers to fibers, filaments, yarns, or rovings (e.g., bundles of fibers) having a length that is generally limited only by the length of the part. For example, such fibers may have a length greater than about 25 millimeters, in some embodiments about 50 millimeters or more, and in some embodiments, about 100 millimeters or more. The continuous fibers may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions, e.g., spectra. Glass fibers and carbon fibers are particularly desirable for use in the continuous fibers. Such fibers often have a nominal diameter of about 4 to about 35 micrometers, and in some embodiments, from about 9 to about 35 micrometers. The tow or fibrous bundles must contain untwisted filaments. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain continuous carbon fibers, while other rovings may contain glass fibers. The number of fibers contained in each roving can be constant or vary from roving to roving.

The term "long fibers" generally refers to fibers, filaments, yarns, or rovings that are not continuous and have a length of from about 0.5 to about 25 millimeters, in some embodiments, from about 0.8 to about 15 millimeters, and in some embodiments, from about 1 to about 12 millimeters. The long fibers may be formed from any of the material, shape, and/or size as described above with respect to the continuous fibers. Glass fibers and carbon fibers are particularly desirable for use as the long fibers.

Any of a variety of thermoplastic polymers or resins may be employed to form the thermoplastic matrix in which the continuous and long fibers are embedded. Suitable thermoplastic polymers for use in the present disclosure may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS")), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth.

Referring now to the drawings, wherein the depictions are for the purpose of illustrating certain exemplary embodiments only and not for the purpose of limiting the same, FIG. 1 schematically shows an exemplary extrusion system 100. The system 100 includes a first extruder 101 containing a screw shaft 108 mounted inside a barrel 103. A heater 110 (e.g., electrical resistance heater) is mounted outside the barrel 103. During use, a first thermoplastic polymer or resin feedstock 102 is supplied to the extruder 101 through a hopper 106. The feedstock 102 may contain long fibers, may be free of long fibers, and/or such fibers may be supplied at another location (not shown), such as downstream from the hopper 106 and/or other feed ports.

The thermoplastic feedstock 102 is conveyed inside the barrel 103 by the screw shaft 108 and may be heated by frictional forces inside the barrel 103 and by the heater 110. Upon being heated, the feedstock 102 exits the barrel 103 through a barrel flange 114 and enters a die flange 116 of an impregnation die 120, i.e., a melt extrusion die. A continuous fiber roving 105 or a plurality of continuous fiber rovings 105 are supplied from a reel or reels 104 to die 120. The rovings 105 are generally kept apart a certain distance before impregnation, such as at least about 4 millimeters, and in some embodiments, at least about 5 millimeters. In one embodiment, a tension assembly 109 may be utilized to impart a tension upon the rovings 105. The tension assembly 109 may be implemented to provide a tension of an outside pull nature so as to eliminate twist in the rovings 105. Tensioning helps spread the tow to a desirable width to allow impregnation, supplies a desirable force to impregnate any particular resin due to its viscosity and heat stability and finally provides a force that goes into twisting which also aids in removing excess resin and impregnation. This tension applied to the rovings 105 can range from a quarter of a pound to ten pounds of resistance tension placed upon the rovings 105.

In various embodiments, the rovings 105 may be pre-heated in an oven 111 before moved into the die 120. Pre-heating the rovings 105, removes residual moisture from either the rovings 105 or the sizing on the rovings 105. This oven 111 could be set at temperatures anywhere from 200-degrees F. to 800-degrees F., depending on the properties of the particular type of rovings 105, sizing of the rovings 105, and the speed at which the rovings 105 travel through the oven 111. Pre-heating allows for more desirous spreading and adhesion of the matrix resin to the reinforcement surface of the rovings 105. Subsequent or concurrent with pre-heating in the oven 111, the rovings 105 may be spread and pre-heated while traveling within an assembly 113 having alternating pins with radial surfaces that further increase spreading and pre-heat of the rovings 105 at temperatures ranging from 150 F to 850 F depending on the particular type of roving 105.

The feedstock 102 may further be heated inside the die 120 by heaters 122 mounted in or around the die 120. The die 120 is generally operated at temperatures that are sufficient to cause melting and impregnation of the thermoplastic polymer 102. Typically, the operation temperatures of the die 120 is higher than the melt temperature of the thermoplastic polymer. When processed in this manner, the continuous fiber rovings 105 become embedded in the polymer matrix, which may be a resin processed from the feedstock 102. The mixture is then extruded from the impregnation die 120 to create a first extrudate 124.

A pressure sensor 112 may be used to monitor pressure near the impregnation die 120 to allow control to be exerted over the rate of extrusion by controlling the rotational speed of the screw shaft 108, or the feed rate of the feeder. That is, the pressure sensor 112 is positioned near the impregnation die 120 so that the extruder 101 can be operated to deliver a preferable amount of molten polymer for interaction with the fiber rovings 105. In various embodiments, the preferable amount of resin is an amount to sufficient to be equally spread across the rovings 105 at a percentage level that allows for the full covering of the filaments surface within the reinforcement bundle without excess. By only applying a minimum amount at the step, there remains potential for a secondary resin to be applied later to this extrudate 124.

In one embodiment, the reel 104 may be directly supplied into the impregnation die 120. This may be desirable for some fibers, ropes, or cables that have been previously prepared, for example, twisted, knitted, braided, woven, or layered/plied rovings. In one embodiment, the rovings 105 are twisted, knitted, braided, woven, and/or layered/plied before being supplied into the pre-heating in the oven 111 or the impregnation die 120.

Figure 1B:
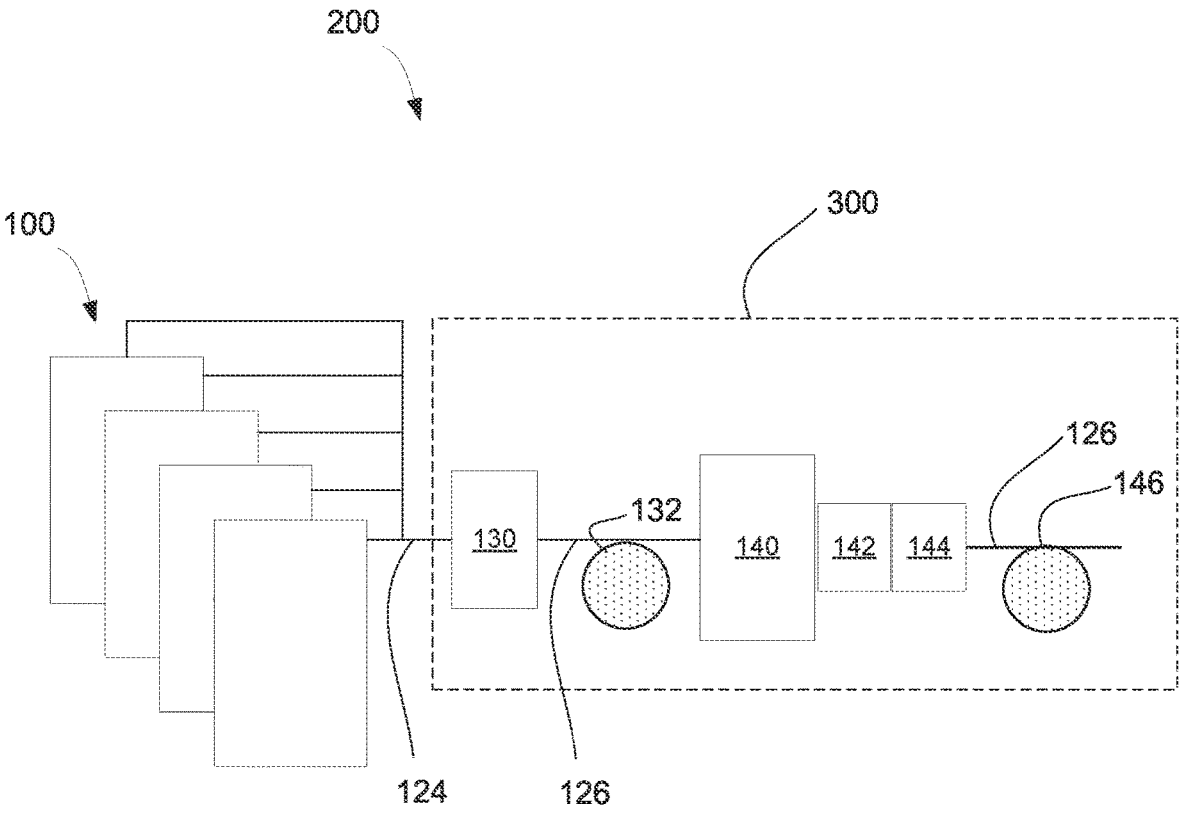
FIG. 1B schematically shows another exemplary thermoplastic polymer or resin impregnation system, in accordance with the present disclosure.

FIG. 1B shows a further exemplary thermoplastic polymer or resin impregnation systems 200. As FIG. 1B shows, the exemplary system 200 can include one or more thermoplastic polymer or resin impregnation systems 100 such as described hereinabove. In one embodiment, the system 100 includes one or more reels of pre-impregnated rovings instead of the one or more thermoplastic polymer or resin impregnation systems 100. The reels of pre-impregnated rovings and/or the extrudate 124 out of the systems 100 can be twisted, knitted, braided, woven, and/or layered/plied.

The system 200 further includes a thermoplastic polymer or resin finishing system 300. The system 300 inputs the pre-impregnated rovings from the reels or the system(s) 100 into a joining module 130 that may be configured to twist, knit, braid, weave, layer, and/or ply each of the inputs from the reels or the system(s). For example, an exemplary joining module 130 may input five pre-impregnated rovings 124, as shown in FIG. 1B, (that may have already been braided), and then braiding them together. After being combined in the joining module 130, a wheel 132, e.g., a dead-head wheel, may be used to wind the joined rovings 126 from which tension may begin.

From the wheel 132, the rovings 126 may be moved through an oven 140. In some embodiments, the oven may include an impregnation die and/or thermoplastic polymer or resin bath which may have a separate feedstock, from which to further impregnate the rovings. A diameter of the pre-impregnated rovings will be reduced within the oven 140, while heated and under tension. This reduction in diameter will force more thermoplastic polymer or resin from the pre-impregnated rovings, filling in potential air pockets that may exist within the rovings. The excess thermoplastic polymer or resin may then be removed by a stripping die 142, which may be the extruder die assembly 40 described herein below.

In some embodiments, an overcoating die may be used alternatively to the stripping die 142 or supplementary thereto depending on the particular application. After the stripping die 142 the rovings 126 can be moved through a chilling device 144 which chills the rovings 126 to a temperature at which the molten polymer or resin becomes solid, while still under tension. Various chilling devices may be incorporated subsequent to the oven 140, the chilling devices being known in the art. Once chilled the rovings 126 can be wound, partially or completely, around a puller 146. The puller 146 acts to impart tension on the rovings 126 between the wheel 132 and the puller 146.

In one embodiment, the puller 146 may be configured to twist the rovings 126 while the rovings are within the oven 140. Twisting while in the impregnation die 120 or in the oven 140 aids in further impregnation and takes any excess resin and displaces it to the surface of the bundle.

Figure 2:
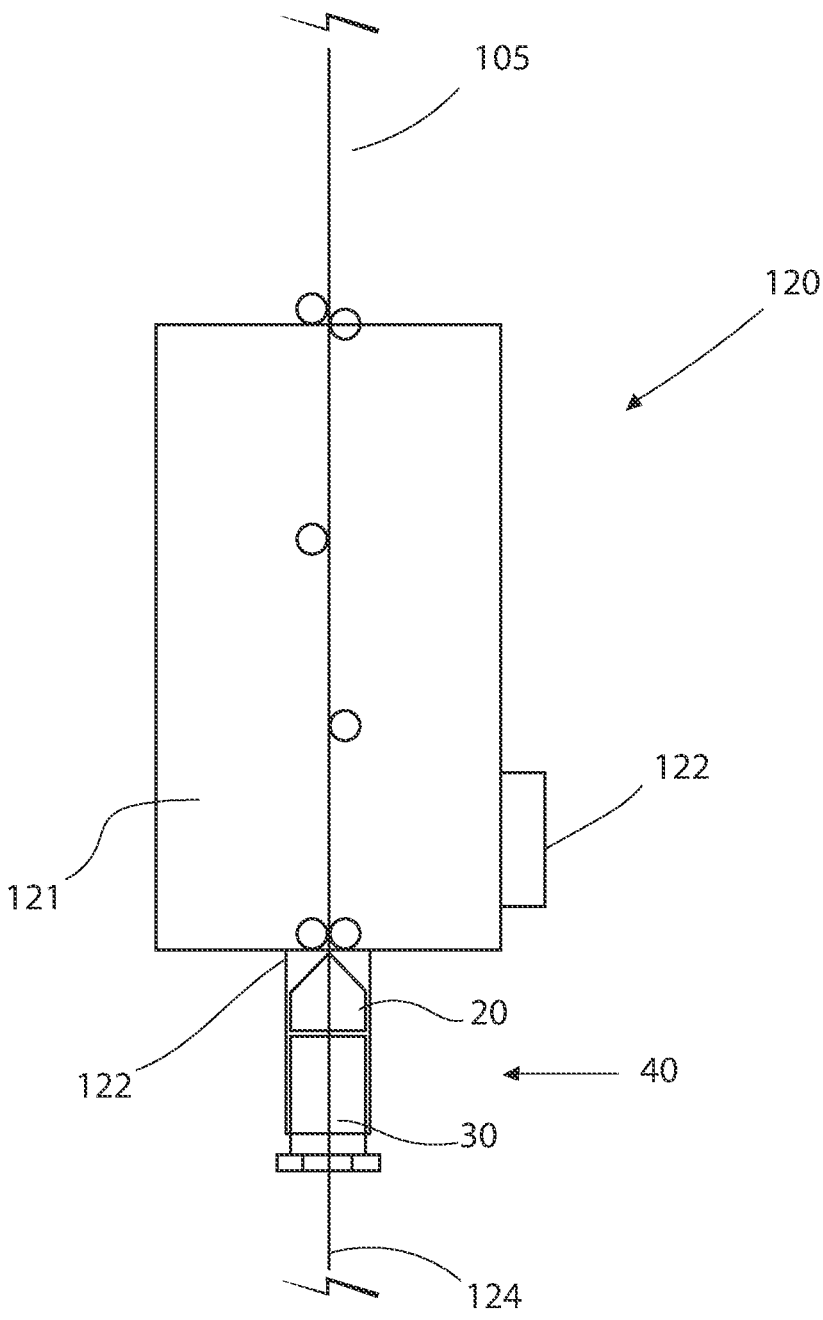
FIG. 2 schematically shows an exemplary impregnation die, in accordance with the present disclosure.

The exemplary impregnation die 120 is shown schematically in FIG. 2. As FIG. 2 shows, the exemplary die 120 includes an extruder die assembly 40. The extruder die assembly 40 includes an insert 20 and a mechanical locking mechanism 30. The exemplary die 120 may include a thermoplastic polymer or resin bath 121 configured to coat the rovings 105 before entering the extruder die assembly 40.

Figure 3:
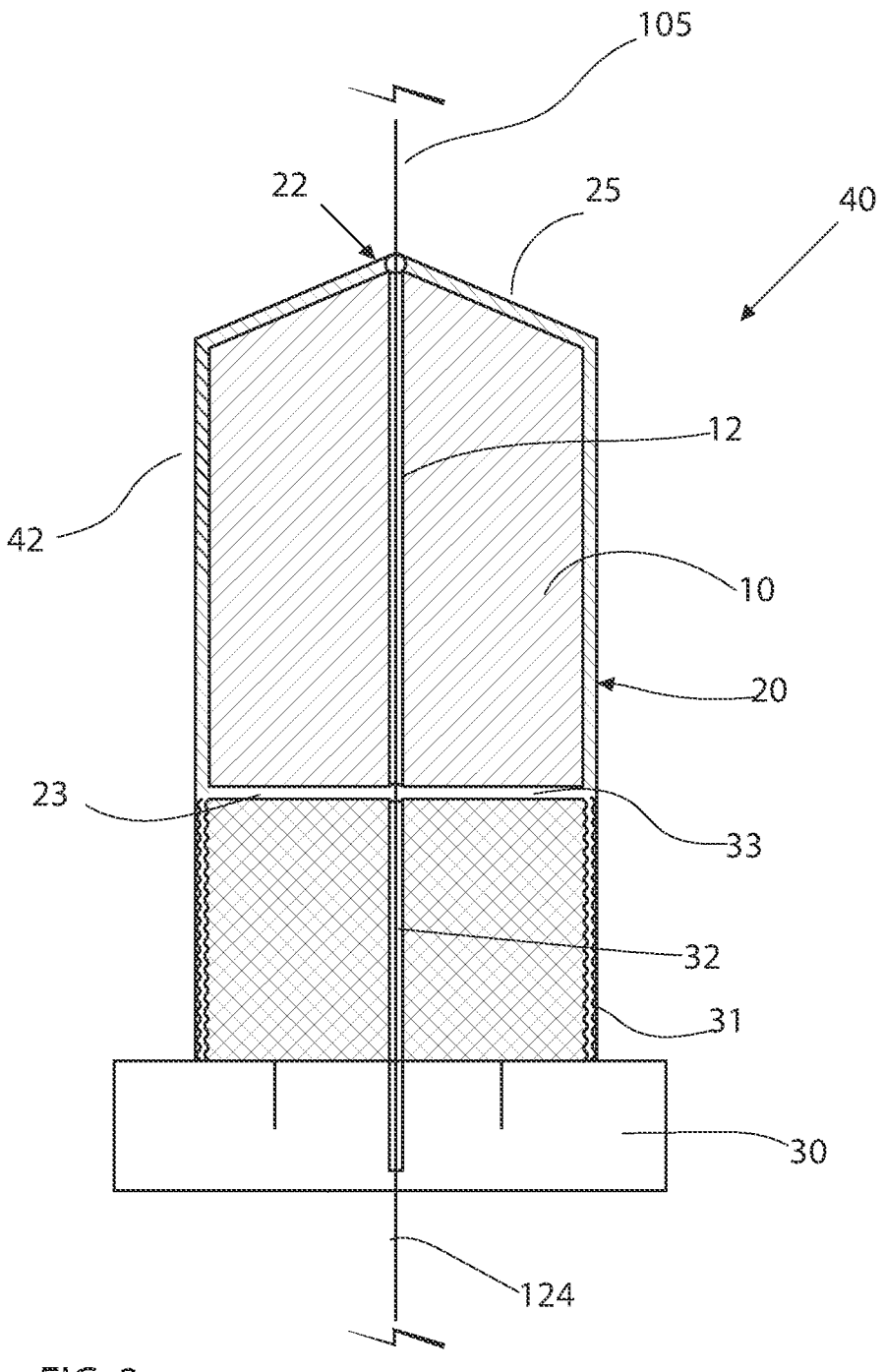
FIG. 3 shows a cross-sectional view of an exemplary extruder die assembly, in accordance with the present disclosure.

FIG. 3 shows a cross-sectional view of the exemplary extruder die assembly 40. As FIG. 3 shows, the exemplary extruder die assembly 40 can include a housing 42. The housing 42 can be formed of rigid material sized and shaped to receive the insert 20 and the mechanical locking mechanism 30.

As FIG. 3 shows, the insert 20 includes a passage 12 configured to receive the rovings 105. The passage 12 may be sized and shaped for the particular rovings 105. For example, the passage 12 may have a circular cross-sectional shape to receive a corresponding circular cross-sectional shaped rope or cable. In some embodiments, the passage 12 may be cross sectionally shaped as flat or rectangular shaped, oval, circular, triangular, rapezium, diamond, rhombus, parallelogram, rectangle, pentagon, hexagon, heptagon, oblong, octagon, nonagon, decagon, a shape with irregular geometry, star, gear, shaped without departing from the spirit and scope of the disclosed principles.

The insert 20 is shown with a conical shaped end 25. It is contemplated herein that the end 25 may be shaped differently, including, e.g., planar-shaped. The end 25 includes an inlet 22 of the passage 12.

The insert 20 is formed of a resilient or elastomer material 10. The term "elastomer material" or "resilient material" may refer a naturally occurring material or a synthetic material, such as a polymeric material which can be stretched or deformed and return to its original shape without substantial permanent deformation such as silicon or silicon-based materials. In one embodiment, the insert 20 is integrally formed with this elastomer material or resilient material. In some embodiments, engineered plastics, filled and non filled, e.g., PPS, PEEK, PES, Nylons (registered trademark), Teflon (registered trademark), etc. may be used as the insert 20. In one embodiment, the insert 20 is formed of a malleable, compressible, materials that may be metallic and/or non-metallic, e.g., lead, zinc, copper, aluminum, etc. In one embodiment, the insert 20, includes an embedded wire mesh or frame for added rigidity.

The mechanical locking mechanism 30 is configured to secure the insert 20 in place. The mechanism 30 may be formed of a rigid material having a substantially flat, planar end 33 sized and shaped to abut an end 23 of the insert 20. The mechanism 30 includes a passage 32 axially aligned with the passage 12 of the insert 20.

The mechanical locking mechanism 30 is shown as having threaded walls 31 for threadably securing matching walls within a housing 42 of the exemplary die 120. In one embodiment, the mechanical locking mechanism 30 is attached via mechanical fasteners to the housing 42. In one embodiment, the housing 42 includes receiving flanges to receive mechanical fasteners from the mechanical locking mechanism 30, which may be threaded bolts or screws.

In one embodiment, the housing 42 is formed of brass. In one embodiment, the housing 42 includes an opening proximate to the inlet 22 that has a larger opening than the inlet 22. In one embodiment, the inlet 22 of the insert 20 traverses through the opening of the housing 42 when the insert 20 is under pressure from the mechanism 30. In one embodiment, the opening of the housing 42 is sized so that fibers from the rovings 105 do not come in contact with its surface when traversing through the inlet 22.

In one embodiment, the mechanical locking mechanism 30 is configured to slightly compress the insert 20. In this way, the passage 12 may narrow, putting pressure on surfaces of the rovings 105 as it traverses through.

It is contemplated herein that hydraulic or pneumatic pressure may be applied to the insert 20, in various embodiments.

Figure 4:
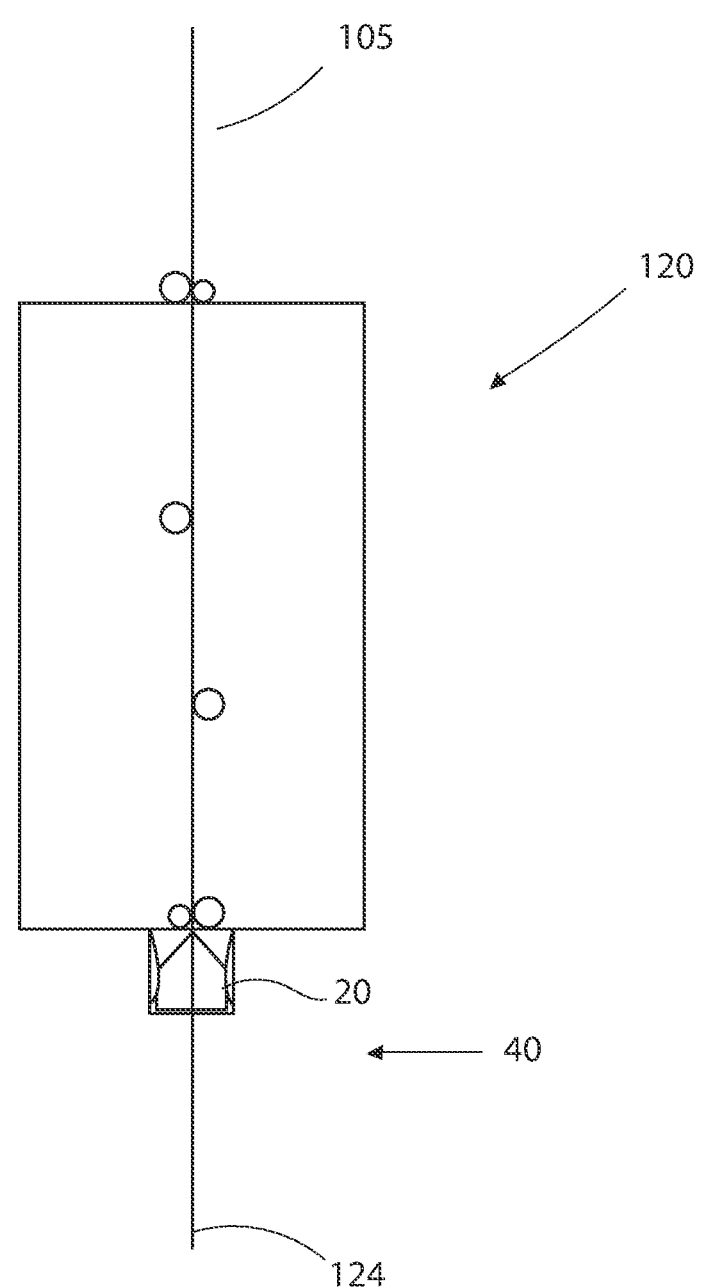
FIG. 4 shows another exemplary embodiment of the exemplary extruder die assembly, in accordance with the present disclosure.

FIG. 4 shows an exemplary embodiment of the exemplary extruder die assembly 40 without the mechanism 30. As FIG. 4 shows, the housing 42 is crimped to put pressure on the insert 20.

In one embodiment, the insert 20 may function as a coextrusion feedblock and therefore have additional passages for bringing together molten streams of thermoplastic materials from multiple extruders. The individual streams from different extruders are brought together in the coextrusion feedblock to form particular layer arrangements. The resulting multi-layer extrudate flow is then delivered to a subsequent extrusion die, or another downstream tool, to produce the desired composite coextrusion structure. The inlet of the additional passages would be similar to the inlet 22, in which the housing 42 has an opening to the inlet 22 permitting rovings to pass through the insert 20 in contact with its elastomer material or resilient material formed thereof.

In one embodiment, after leaving the die 120, the extrudate 124 can moves through an impregnation die assembly having a series of alternating, heated, impregnation pins. These pins may also have convex and concave surfaces to allow the polymer to move both in an x and y direction for thorough impregnation of the extrudate 124.

In various embodiments, the extrudate 124, or impregnated fiber rovings 105, may then be moved through a cooling a rolling assembly which may include a nip formed between two adjacent rollers to enhance fiber impregnation and squeeze out any excess voids. The resulting consolidated cable or rope can then be pulled by tracks mounted on rollers. The tracks can also pull the extrudate 124 from the impregnation die 120 and/or the impregnation die assembly and through the rollers.

In one embodiment, the extrudate 124 is then twisted into a circular bundle which again aids in further impregnation and takes any excess resin and displaces it to the surface of the bundle. This impregnated cord of reinforcement material may then be chilled to a temperature at which the molten polymer becomes solid.

In various embodiments, a tension-regulating device may also be employed to help control the degree of tension. The device may include inlet plate that lies in a vertical plane parallel to the rotating spindles of the creel. The tension-regulating device may contain cylindrical bars arranged in a staggered configuration so that the rovings 105 pass over and under these bars to define a wave pattern. The height of the bars can be adjusted to modify the amplitude of the wave pattern and control tension.

If desired, the extrudate 124 may be heated in an oven having any of a variety of known configuration, such as an infrared oven, convection oven, etc. During heating, the fibers are unidirectionally oriented to optimize the exposure to the heat and maintain even heat across the entire profile. The temperature to which the ribbons are heated is generally high enough to soften the thermoplastic polymer to an extent that the ribbons can bond together. However, the temperature is not so high as to destroy the integrity of the material.

If desired, the extrudate 124 may also be applied with a capping layer to enhance the aesthetic appeal of the extrudate 124 and/or protect it from environmental conditions. For example, such a capping layer may be applied via an extruder oriented at any desired angle to introduce a thermoplastic polymer or resin into a capping die. The resin may contain any suitable thermoplastic polymer known in the art that is generally compatible with the thermoplastic polymer used to form the profile. Suitable capping polymers may include, for instance, acrylic polymers, polyvinyl chloride (PVC), polybutylene terephthalate (PBT), ABS, polyolefins, polyesters, polyacetals, polyamids, polyurethanes, etc. Although the capping resin is generally free of fibers, it may nevertheless contain other additives for improving the final properties of the profile. Additive materials employed at this stage may include those that are not suitable for incorporating into the continuous fiber or long fiber layers. For instance, it may be desirable to add pigments to the composite structure to reduce finishing labor of shaped articles, or it may be desirable to add flame retardant agents to the composite structure to enhance the flame retarding features of the shaped article. Because many additive materials are heat sensitive, an excessive amount of heat may cause them to decompose and produce volatile gases. Therefore, if a heat sensitive additive material is extruded with an impregnation resin under high heating conditions, the result may be a complete degradation of the additive material. Additive materials may include, for instance, mineral reinforcing agents, lubricants, flame retardants, blowing agents, foaming agents, ultraviolet light resistant agents, thermal stabilizers, pigments, and combinations thereof. Suitable mineral reinforcing agents may include, for instance, calcium carbonate, silica, mica, clays, talc, calcium silicate, graphite, calcium silicate, alumina trihydrate, barium ferrite, and combinations thereof.

While not shown in detail herein, the capping die may include various features known in the art to help achieve the desired application of the capping layer. For instance, the capping die may include an entrance guide that aligns the incoming extrudate 124. The capping die may also include a heating mechanism (e.g., heated plate) that pre-heats the profile before application of the capping layer to help ensure adequate bonding.

Following optional capping, the shaped part may be supplied to a cooling system as is known in the art. The cooling system may, for instance, be a vacuum sizer that includes one or more blocks (e.g., aluminum blocks) that completely encapsulate the profile while a vacuum pulls the hot shape out against its walls as it cools. A cooling medium may be supplied to the sizer, such as air or water, to solidify the profile in the correct shape.

Following optional capping, the shaped part is then finally cooled using a cooling system as is known in the art. The cooling system may, for instance, be a vacuum sizer that includes one or more blocks (e.g., aluminum blocks) that completely encapsulate the profile while a vacuum pulls the hot shape out against its walls as it cools. A cooling medium may be supplied to the sizer, such as air or water, to solidify the profile in the correct shape.

Vacuum sizers are typically employed when forming the profile. Even if a vacuum sizer is not employed, however, it is generally desired to cool the profile after it exits the capping die (or the consolidation or calibration die if capping is not applied). Cooling may occur using any technique known in the art, such a vacuum water tank, cool air stream or air jet, cooling jacket, an internal cooling channel, cooling fluid circulation channels, etc. Regardless, the temperature at which the material is cooled is usually controlled to achieve optimal mechanical properties, part dimensional tolerances, good processing, and an aesthetically pleasing composite. For instance, if the temperature of the cooling station is too high, the material might swell in the tool and interrupt the process. For semi-crystalline materials, too low of a temperature can likewise cause the material to cool down too rapidly and not allow complete crystallization, thereby jeopardizing the mechanical and chemical resistance properties of the composite. Multiple cooling die sections with independent temperature control can be utilized to impart the optimal balance of processing and performance attributes. In one particular embodiment, for example, a vacuum water tank is employed that is kept at a preset temperature range.

As will be appreciated, the temperature of the profile as it advances through any section of the system of the present invention may be controlled to yield optimal manufacturing and desired final composite properties. Any or all of the assembly sections may be temperature controlled utilizing electrical cartridge heaters, circulated fluid cooling, etc., or any other temperature controlling device known to those skilled in the art.

In various embodiments, a pulling device is positioned downstream from the cooling system that pulls the finished profile through the system for final sizing of the composite. The pulling device may be any device capable of pulling the profile through the process system at a desired rate. Typical pulling devices include, for example, caterpillar pullers and reciprocating pullers. If desired, one or more calibration dies (not shown) may also be employed. Such dies contain openings that are cut to the exact profile shape, graduated from oversized at first to the final profile shape. As the profile passes therethrough, any tendency for it to move or sag is counteracted, and it is pushed back (repeatedly) to its correct shape. Once sized, the profile may be cut to the desired length at a cutting station (not shown), such as with a cut-off saw capable of performing cross-sectional cuts.

As will be appreciated, the particular profile embodiment described above is merely exemplary of the numerous designs that are made possible by the present invention. Among the various possible profile designs, it should be understood that additional layers of continuous and/or long fiber material may be employed in addition to those described above.

Figure 5:
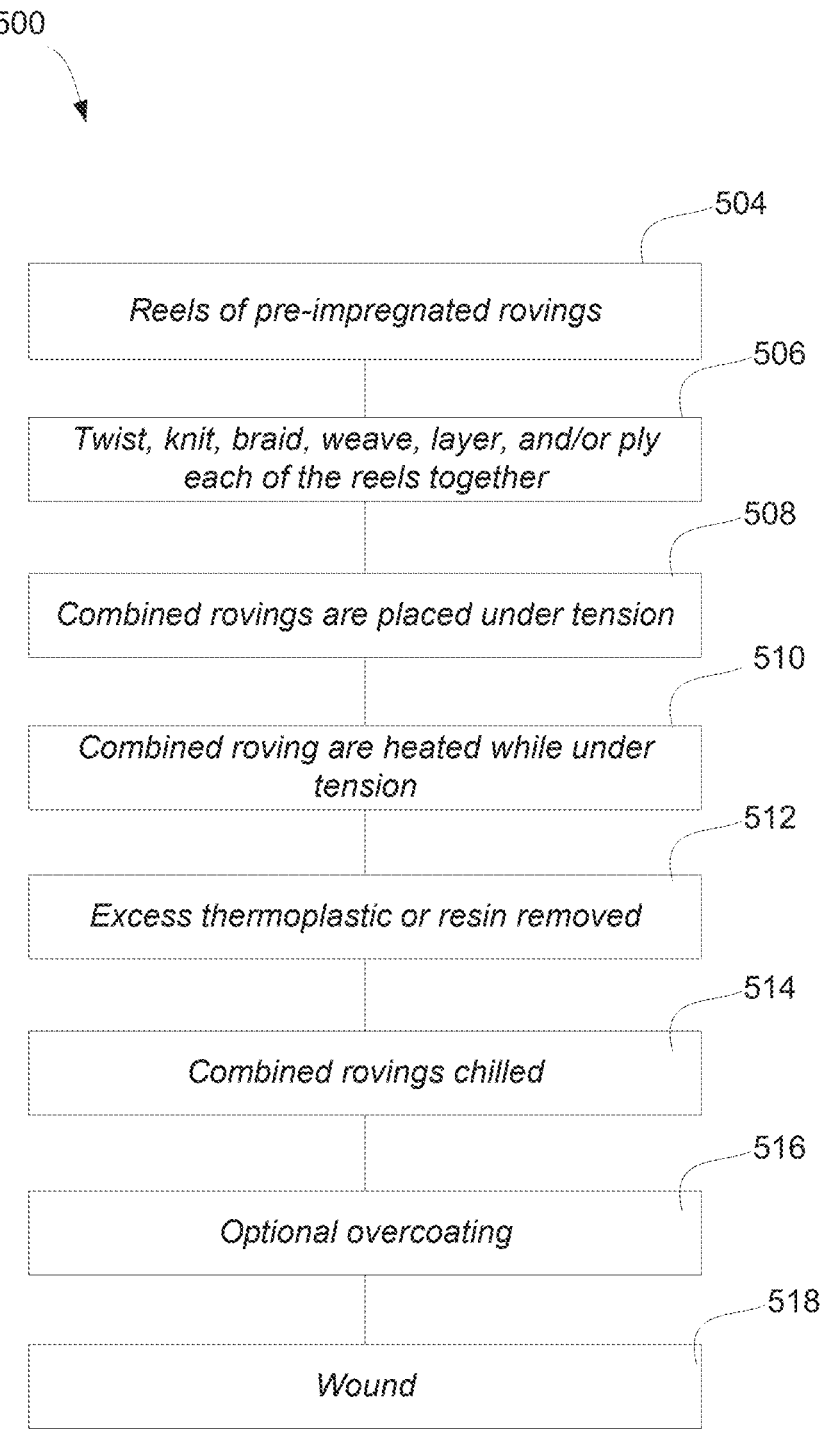
FIG. 5 shows an exemplary process for thermoplastic polymer or resin extrusion, in accordance with the present disclosure.

FIG. 5 shows an exemplary process 500 for thermoplastic polymer or resin extrusion. As FIG. 5 shows, the process 500 may be initiated at step 504 by introducing two or more reels of pre-impregnated rovings into a system such as described hereinabove. The pre-impregnated rovings may then be placed under tension or pre-heated. At step 506, the pre-impregnated rovings from the reels are twisted, knitted, braided, woven, layered, and/or plied with each other.

At step 508, the combined rovings are placed under tension between a wheel, e.g., 132 and a puller, e.g., 146. At step 510, the combined rovings are moved through an oven when under tension. In various embodiments the oven can include a various impregnation dies and/or a thermoplastic polymer or resin bath. The combined rovings can then be moved through a stripping die at step 512. After stripping any excess thermoplastic or resin, the combined rovings can then be chilled at step 514. At step 516 an overcoat may be applied. The combined rovings can then be wound at step 518 for delivery, or for further combination with other combined rovings. By further combining successive rovings, larger and larger rope or cords may be made with reduced air pockets within.

While many uses are contemplated by the teachings herein, it is particularly notable that the improved rope, cable, or ribbon may be used as fishing line or to string tennis rackets.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:

1. A method for manufacturing rope, comprising:
receiving a plurality of thermoplastic polymer or resin impregnated rovings;
combining the plurality of thermoplastic polymer or resin impregnated rovings into a combined roving using a joining module;
tensioning the combined roving using a dead-head wheel downstream of the joining module;
heating the combined roving in an oven;
removing excess thermoplastic polymer or resin from a surface of the combined roving;
chilling the combined roving while under tension using a chilling device; and
wherein the tensioning is generated between the oven and the chilling device by using the dead-head wheel downstream of the joining module and upstream of the oven and a puller downstream of the chilling device.

2. The method of claim 1, wherein the removing excess thermoplastic polymer or resin from a surface of the combined roving is executed using a thermoplastic extrusion die, comprising: a housing and a resilient insert having an inlet through the housing, and a passage through the resilient insert.

3. The method of claim 1, further comprising: a thermoplastic extrusion die having a mechanical locking mechanism configured to abut an end of a resilient insert.

4. The method of claim 3, further comprising: a mechanical locking mechanism having a passage therethrough axially aligned with the passage through the resilient insert.

5. The method of claim 3, wherein the mechanical locking mechanism is threadably secured to a housing and configured to slightly compress the resilient insert.

6. The method of claim 3, wherein the mechanical locking mechanism is mechanically connected to a housing and configured to slightly compress the resilient insert.

7. The method of claim 2, wherein the housing is crimped to slightly compress the resilient insert.

8. The method of claim 2, wherein the resilient insert is formed of a silicon-based material.

9. The method of claim 2, wherein the resilient insert comprises an embedded wire mesh or frame.

10. The method of claim 2, wherein the resilient insert comprises a conical-shaped end.

11. A method for manufacturing rope, comprising:
receiving a plurality of thermoplastic polymer or resin impregnated rovings;
combining the plurality of thermoplastic polymer or resin impregnated rovings into a combined roving using a joining module;
tensioning the combined roving using a dead-head wheel downstream of the joining module, wherein the tensioning is controllable using the dead-head wheel;
heating the combined roving in an oven;
removing excess thermoplastic polymer or resin from a surface of the combined roving;
chilling the combined roving while under tension using a chilling device;
wherein the tensioning is generated between the oven and the chilling device by using the dead-head wheel downstream of the joining module and upstream of the oven and a puller downstream of the chilling device; and
wherein the removing excess thermoplastic polymer or resin from a surface of the combined roving is executed using a thermoplastic extrusion die, comprising:
a housing;
an insert having an inlet through the housing, and a first passage through the insert, the insert formed of an elastomer material and sized and shaped to abut inner walls of the housing; and a mechanical locking mechanism configured to communicate physical pressure to the insert.

12. The method of claim 11, wherein the mechanical locking mechanism comprises a second passage axially aligned with the first passage of the insert.

13. The method of claim 11, wherein the mechanical locking mechanism is mechanically connected to the housing.

14. The method of claim 11, wherein the elastomer material is a silicon-based material.

15. The method of claim 11, wherein the elastomer material is a plastic-based material.

16. A method for manufacturing rope, comprising:
receiving a plurality of thermoplastic polymer or resin impregnated rovings;
combining the plurality of thermoplastic polymer or resin impregnated rovings into a combined roving using a joining module;
tensioning the combined roving using a dead-head wheel downstream of the joining module at a greater than non-nominal tension;
heating the combined roving in an oven;
removing excess thermoplastic polymer or resin from a surface of the combined roving;
chilling the combined roving while under tension using a chilling device;
wherein the tensioning is generated between the oven and the chilling device by using the dead-head wheel downstream of the joining module and upstream of the oven and a puller downstream of the chilling device; and
wherein the removing excess thermoplastic polymer or resin from a surface of the combined roving is executed using a thermoplastic extrusion die, comprising:
a housing;
an insert having an inlet through the housing, and a first passage through the insert, the insert formed of a plastic material and sized and shaped to abut inner walls of the housing; and
a mechanical locking mechanism configured to communicate physical pressure to the insert.

17. The method of claim 16, wherein the plastic material is one of a PPS, PEEK, or PES material.

18. The method of claim 16, wherein the plastic material is a nylon-based material.

19. The method of claim 16, wherein the plastic material is a Polytetrafluoroethylene-based material.

* * * * *